United States Patent [19]
Penry

[11] Patent Number: 5,944,808
[45] Date of Patent: Aug. 31, 1999

[54] PARTIAL PARITY CORRECTION LOGIC

[75] Inventor: David A. Penry, San Jose, Calif.

[73] Assignee: Sun Microsystems, Inc., Palo Alto, Calif.

[21] Appl. No.: 08/792,892

[22] Filed: Jan. 31, 1997

[51] Int. Cl.$^6$ .................................................. G06F 13/00
[52] U.S. Cl. ............................................ 710/129; 714/48
[58] Field of Search ................................... 395/309, 308, 395/306, 185.01

[56] References Cited

U.S. PATENT DOCUMENTS

| | | | |
|---|---|---|---|
| 5,499,346 | 3/1996 | Amini et al. | |
| 5,519,872 | 5/1996 | Khandekar et al. | 395/310 |
| 5,522,050 | 5/1996 | Amini et al. | |
| 5,533,204 | 7/1996 | Tipley | 395/288 |
| 5,594,886 | 1/1997 | Smith et al. | 395/463 |
| 5,666,556 | 9/1997 | Khandekar et al. | 395/823 |
| 5,682,509 | 10/1997 | Kabenjian | 395/309 |
| 5,724,528 | 3/1998 | Kulik et al. | 395/308 |
| 5,867,675 | 2/1999 | Lomelino et al. | 395/309 |

*Primary Examiner*—Ayaz R. Sheikh
*Assistant Examiner*—David A Wiley
*Attorney, Agent, or Firm*—The Gunnison Law Firm

[57] ABSTRACT

A PCI-to-PCI bridge circuit configurable to pass a parity error from one bus to the other bus during a prefetch includes a first interface for interfacing with a first PCI bus, a second interface for interfacing with to a second PCI bus, and a parity correction logic circuit. In response to one of a set of predetermined read commands from a device on the first PCI bus to read data from a device on the second PCI bus, the bridge circuit will initiate a prefetch transaction on the second PCI bus to read the requested data from the device on the second PCI bus. The parity correction logic circuit is coupled to receive from the first interface a first byte enable signal and a second byte enable signal, which are part of the read transaction on the first PCI bus. The parity correction logic circuit is also coupled to receive from the second interface a parity signal corresponding to the prefetch transaction on the second PCI bus. The parity correction logic circuit provides to the first interface a parity signal that causes a data parity error for the read transaction on said first PCI bus when the prefetch read transaction on said second PCI bus has a data parity error.

22 Claims, 5 Drawing Sheets

PARTIAL PARITY CORRECTION LOGIC

FIELD OF THE INVENTION

This invention relates to parity generation circuits and, more particularly, to parity generation circuits for use in bus interfaces. Still more particularly, this invention relates to parity generation circuits for use in bus interfaces in bus-to-bus bridge circuits.

BACKGROUND

Modern computer systems typically include several devices that communicate to each other over a bus. In some computer systems, multiple buses are required to allow efficient communication between all of the devices in the computer system. For example, a computer system may have several subsystems. The subsystems are interconnected through a first bus. In addition, each subsystem may have a subsystem bus to allow devices implementing the subsystem to communicate with each other. In such computer systems, a bus-to-bus bridge may be required to interconnect the first bus with a subsystem bus so that a device on the first bus may communicate with a device on the subsystem bus.

FIG. 1 is a block diagram of an exemplary system 100 with a first bus 101, a second bus 103 and a bridge 105 interconnecting the first bus 101 and the second bus 103. Several devices $107_1$–$107_N$ communicate with each other over the first bus 101. Similarly, devices $109_1$–$109_M$ communicate with each other over the second bus 103. The bridge 105 allows a device connected to the first bus 101 to communicate with a device connected to the second bus 103. In some applications, the bus 101 does not use the same protocols as the bus 103 and, thus, the bridge 105 must translate the communications from one bus in transferring the communication to the other bus. For example, such a bridge is disclosed in U.S. Pat. No. 5,522,050 entitled "Bus-to-Bus Bridge for a Multiple Information Handling System That Optimizes Data Transfers Between a System Bus and a Peripheral Bus", issued May 28, 1996 to Amini et. al., which is incorporated herein by reference.

FIG. 2 is a block diagram of an exemplary computer system 200 with a host bus 201 interconnecting a central processing unit (CPU) 203 and a memory 205. The CPU 203 is configured to access the memory 205 over the host bus 201. A host bridge 207 is connected to the host bus 201 to allow communication between the CPU 203 and devices connected to a peripheral bus 209. In this example, the peripheral bus 209 is a PCI (peripheral component interconnect) Local Bus. A more detailed description of the PCI Local Bus (hereinafter "PCI bus") is provided in "PCI Local Bus Specification Revision 2.1", published Jun. 1, 1995 by the PCI Special Interest Group, and which is incorporated by reference herein.

In this example, a PCI-to-PCI bridge 211 is connected to the PCI bus 209. It is understood that other PCI bus compliant devices can be connected to the PCI bus 209. The "PCI-to-PCI Bridge Architecture Specification Revision 1.0", published Apr. 5, 1994 by the PCI Special Interest Group, sets forth the requirements of a PCI-to-PCI bridge, and is also incorporated by reference herein. The bridge 211 includes a primary master interface state machine 213 and a primary target interface state machine 215, that adhere to the requirements of the aforementioned PCI Local Bus Specification. In addition, the bridge 211 includes secondary master and target interface state machines 217 and 219 for interacting with a second PCI bus 221. The state machines 213 and 215 are referred to as the primary interface state machines because they are connected to the PCI bus that is closest to the CPU 203. The state machines 217 and 219 are referred to as the secondary interface state machines because they are connected to the PCI bus furthest away from the CPU 203. As set forth in the aforementioned PCI-to-PCI Bridge Specification, the primary interface of the bridge 211 handles prefetch operations (described below in conjunction with FIG. 5) differently from the secondary interface.

FIG. 3 is block diagram illustrating some of the signals required by a device in order to communicate over a PCI bus. A PCI compliant device 300 includes at least: (a) thirty-two address/data (AD) lines for carrying thirty-two or sixty-four bit (requiring two address phases) addresses multiplexed with thirty-two or sixty-four bit data words; (b) four command/byte enable (C/BE#) lines for carrying four bit bus commands multiplexed with active low byte enable signals that indicate which bytes of the thirty-two bit data word are selected; (c) a parity (PAR) line for carrying a parity signal that implements even parity over the AD and C/BE lines of the previous clock cycle; (d) a cycle frame (FRAME#) line for carrying an active low signal driven by a bus master indicating the start and duration of a bus access; (e) a target ready (TRDY#) line for carrying an active low signal asserted by a target of a transaction when the target is ready to complete the data phase of the transaction; (f) an initiator ready (IRDY#) line for carrying an active low signal asserted by an initiator (i.e., a bus master) of a transaction when the initiator is ready to complete the data phase of the transaction; (g) a device select (DEVSEL#) line for carrying an active low signal driven by a device that has decoded its address as the target of a transaction; (i) a parity error (PERR#) line for carrying an active low signal asserted by a device that has detected a parity error during a data phase; and (j) a CLK line for receiving a clock signal from a clock generator (not shown). Of course, the signals shown in FIG. 3 are just some of the signals that can be implemented in a PCI bus.

FIG. 4 is a timing diagram illustrative of an exemplary PCI bus read transaction. Although PCI bus read transactions are well known, the following description is included for completeness. This exemplary read transaction uses thirty-two bit addressing and data. During the clock cycle 1, the initiating device asserts the FRAME# signal and drives a bus command (in this example, a read command) and address onto the C/BE# and AD lines, respectively. Thus, at the rising edge of the clock cycle 2, a valid bus command and address are available on the PCI bus.

During the clock cycle 2, the target device asserts the DEVSEL# signal. Thus, at the start of the clock cycle 3, the target device has acknowledged that it is the target. Also during the clock cycle 2, the initiating device asserts the IRDY# signal and the appropriate byte enable signals on the C/BE# lines. Consequently, by the start of the clock cycle 3, the initiating device has indicated that the initiating device is ready to receive the selected bytes of the first requested read data word. The initiating device has also generated the PAR signal with the appropriate logic level during the clock cycle 2 so that at the start of the clock cycle 3, the PAR signal, together with the logic levels of the bus command and address signals at the start the clock cycle 2, have even parity.

During the clock cycle 3, the target device asserts the TRDY# signal and provides the first requested data word on the AD lines. In a normal burst read transaction, typically, all of the byte enable signals are asserted. By the start of the clock cycle 4, valid data is available on the AD lines to be received by the initiating device.

During the clock cycle 4, the target device generates the PAR signal so that there is even parity when the PAR signal is taken together with the data and the bus enable signals at the start of the clock cycle (i.e., clock cycle 4). During the clock cycle 4, the initiating device asserts the appropriate byte enable signals for the second requested data word. In this example, the target device also deasserts the TRDY# signal during the clock cycle 4. Thus, at the start of the clock cycle 5, the PCI bus is in a wait state. During the wait state, the logic states of the AD signals, the C/BE# and the PAR signals at the end of the clock cycle 4 are extended through the end of the clock cycle 4 and into the clock cycle 5.

During the clock cycle 5, the target device asserts the TRDY# signal and provides the second requested data word on the AD lines. Thus, at the start of the clock cycle 6, valid data is present on the AD lines to be received by the initiating device, and valid byte enable signals are available on the C/BE# lines to be received by the target device.

During the clock cycle 6, the target device provides the third data word on the AD lines and provides on the PAR line the appropriate parity signal for the data and byte enable signals of the previous clock cycle. During the clock cycle 6, the initiating device provides the appropriate byte enable signals on the C/BE# lines for the third requested data word. Thus, at the start of the clock cycle 7, the target device has provided the third requested data word on the AD lines and the parity signal for the data and byte enable signals of the second data word.

In addition, in this example, the initiating device deasserts the IRDY# signal because it is not ready to accept the third data word. Thus, the PCI bus enters another wait state, which causes the initiating and target devices to extend the byte enable and the data signals of the clock cycle 7 through the leading edge of the clock cycle 8. The wait state also causes the target device to extend the parity signal generated for the third data word transfer through the clock cycle 9.

Also in this example, the second data word transfer included a parity error. As a result, the initiating device asserts the PERR# signal during the clock cycle 7 so as to be valid during at the start of the clock cycle 8. In accordance with the aforementioned PCI Local Bus Specification, the PERR# signal is asserted two clock cycles after the data transfer containing the parity error.

When the initiating device is on the primary PCI bus and the target device is on the secondary PCI bus, the PCI-to-PCI bridge operates ideally as follows. On the primary PCI bus interface, the PCI-to-PCI bridge provides the signals generated by the target device as described above in conjunction with FIG. 4. Conversely, on the secondary PCI bus interface, the PCI-to-PCI bridge provides the signals generated by the initiating device as described above in conjunction with FIG. 4. In addition, the aforementioned PCI-to-PCI Bridge Specification also requires that when the PCI-to-PCI bridge detects a data parity error, the bad data and bad parity must be passed to the opposite interface, if possible, to allow the parity error recovery mechanisms defined in the aforementioned PCI Local Bus Specification to operate.

Although the bridge 211 allows communication between devices on different PCI buses, a problem arises in generating the parity for certain prefetch transactions. For example, when the initiating device initiates a read transaction, the PCI-to-PCI bridge may be able to initiate a prefetch transaction on the target device's PCI bus. The PCI Local Bus and PCI-to-PCI Bridge Specifications define situations in which the bridge may prefetch read data on the target device's PCI bus. Because prefetching read data is typically faster than a normal read transaction, it may be advantageous to prefetch data on the target device's PCI bus even when the initiating device starts a read transaction selecting only certain bytes.

However, in prefetching data, all of the byte enable signals are asserted. Thus, the PAR signal on the destination PCI bus may have a different logic state than the PAR signal on the initiating PCI bus. If there is a data parity error on the destination PCI bus when the target device provides the prefetched data on the destination PCI bus, the PCI-to-PCI bridge must pass the parity error to the initiating device on the initiating PCI bus, pursuant to the PCI-to-PCI Bus Specification. Thus, the PCI-to-PCI bridge must not simply regenerate the parity signal when transferring the prefetched data from the target's PCI bus to the initiator's PCI bus because this scheme will not preserve parity errors on the target's PCI bus. Accordingly, there is a need for a PCI-to-PCI bridge that passes parity errors from the target device's PCI bus to the initiating device's PCI bus when prefetching read data.

SUMMARY

In accordance with the present invention, a bus-to-bus bridge circuit that can pass a parity error from one bus to the other bus during a prefetch operation is provided. In one embodiment of the invention, a bridge circuit includes a first interface for interfacing with a first bus, a second interface for interfacing with a second bus, and a logic circuit. In response to one of a set of predetermined read commands from a device on the first bus to read data from a device on the second bus, the bridge circuit will initiate a prefetch transaction on the second bus to read the requested data from the device on the second bus. The logic circuit is coupled to receive from the first interface a first byte enable signal and a second byte enable signal, which are part of the read transaction on the first bus. The logic circuit is also coupled to receive from the second interface a parity signal corresponding to the prefetch transaction on the second bus. The logic circuit provides to the first interface a parity signal that causes a data parity error for the read transaction on said first bus when the prefetch read transaction on said second bus has a data parity error.

Because the data on both the initiating and destination PCI buses are the same for the prefetch transaction, the logic circuit can provide on the initiating PCI bus the PAR signal associated with the read data in response to the C/BE# signals and the PAR signal from the target device. In one embodiment, when the parity of the C/BE# signals on the initiating PCI bus matches the parity of the C/BE# signals on the destination PCI bus, the logic circuit provides on the initiating PCI bus a PAR signal having a logic level that is the same as the logic level of the PAR signal provided by the target device. Conversely, when the parity of the C/BE# signals on the initiating PCI bus does not match the parity of the C/BE# signals on the destination PCI bus, the logic circuit provides on the initiating PCI bus a PAR signal having a logic level that is the complement of the logic level of the PAR signal provided by the target device. Thus, the logic circuit provides the PAR signal on the initiating bus so that a data parity error on the destination PCI bus will be preserved on the initiating PCI bus.

Because during a typical prefetch operation the C/BE# signals on the destination bus will be all zeros (i.e., having even parity), the C/BE# signals on the initiating PCI bus need only be parity checked. If the C/BE# signals on the initiating PCI bus have even parity, the logic circuit provides on the initiating PCI bus a PAR signal having the logic level of the PAR signal received from the destination PCI bus. Conversely, if the C/BE# signals on the initiating PCI bus have odd parity, the logic circuit provides on the initiating PCI bus a PAR signal with the opposite polarity of the PAR signal received from the destination PCI bus. Consequently, in one embodiment, the logic circuit includes an exclusive-OR circuit that receives the C/BE# signals from the initiating PCI bus and the PAR signal (corresponding to the requested data provided on the AD lines) from the destination PCI bus. The exclusive-OR circuit performs the exclusive-OR logic function on these received signals to generate the PAR signal for the initiating PCI bus. As a result, if these received C/BE# signals have even parity, the exclusive-OR circuit outputs the logic level of the received PAR signal; but if these received C/BE# signals have odd parity, the exclusive-OR circuit outputs the complement of the logic level of the received PAR signal. Accordingly, the exclusive-OR operation performed on the initiating device's C/BE# signals and the target device's PAR signal will preserve a data parity error generated on the destination PCI bus.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 5:
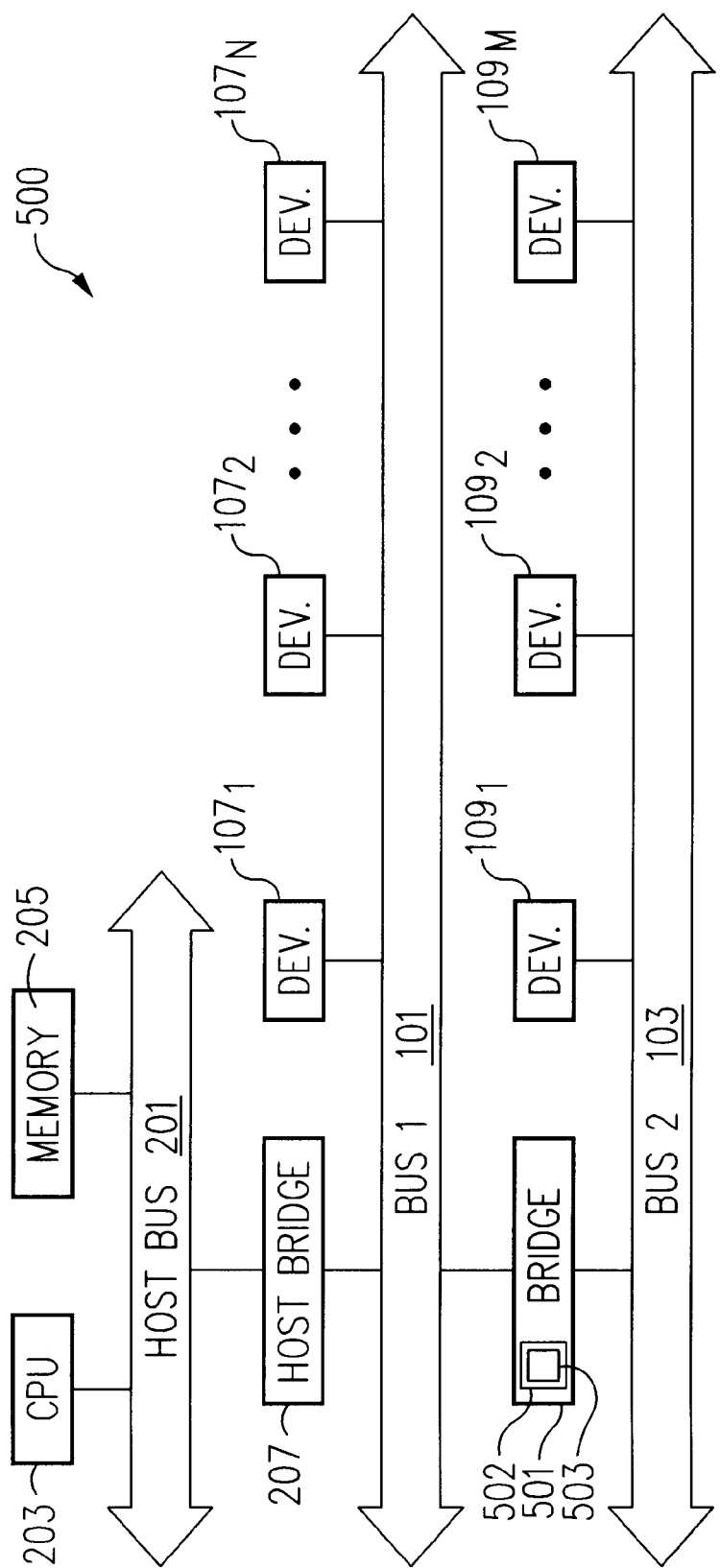
FIG. 5 is a block diagram of an electronic system with a bridge having a parity circuit according to one embodiment of the present invention.

FIG. 5 is a block diagram of an electronic system 500 according to one embodiment of the present invention. The electronic system 500 includes a processor or central processing unit 203, a memory 205, and host bridge 207 attached to a host bus 201, and peripheral devices $107_1$–$107_N$ attached to a bus 101 and peripheral devices $109_1$–$109_M$ attached to a bus 103. In addition, the electronic system includes a bridge circuit 501 with an interface circuit 502 to interface to one of the buses. The interface circuit 502 includes a parity circuit 503 (described below in conjunction with FIGS. 6–8). The bridge circuit 501 includes a second interface circuit (not shown) with a parity circuit to interface with the other bus. The bridge circuit 501 serves to couple the bus 101 to the bus 103. In accordance with the present invention, the parity circuit 503 generates a parity signal for the initiating bus in a prefetch operation so as to pass parity errors from the destination bus to the initiating bus.

The electronic system 500 can be any type of electronic system. In this embodiment, the electronic system 500 is a computer system in which the processor 203 accesses the memory 205 through the host bus 201 and communicates with the peripheral devices $107_1$–$107_N$ and $109_1$–$109_M$ through the host bridge 207. The processor can be any type of processor such as, for example, X86, Sparc®, Alpha®, MIPS®, HP®, and PowerPC® processors. The memory 205 can be any type of memory or interface for use in computer systems. The host bridge can be any conventional host bridge suitable for interconnecting the host bus 201 and the bus 101. Likewise, the peripheral devices can be any type of peripheral device such as, for example, displays, mass storage devices, keyboards or any other type of input or input-output device.

In accordance with the present invention, the parity circuit 503 in the bridge circuit 501 provides a parity signal to the initiating bus during a read operation in which the bridge circuit 501 initiates a prefetch transaction on the destination bus in response to the read transaction on the initiating bus. The parity circuit 503 causes a data parity error for the read transaction on said initiating bus when the prefetch read transaction on said destination bus has a data parity error. Thus, the parity circuit 503 allows the bridge circuit 501 to pass parity errors from the destination bus to the initiating bus so that normal parity error recovery mechanisms can be used without special consideration for the presence of the bridge circuit 501 in the path of the transaction.

For example, if bridge circuit 501 is a PCI-to-PCI bridge, the PCI-to-PCI bridge specification allows the bridge circuit 501 to initiate a prefetch transaction on the destination PCI bus in response to certain read transactions initiated on the initiating PCI bus. Table 1 below summarizes the read transactions on the initiating PCI bus for which the bridge circuit 501 can initiate prefetch transactions on the destination bus.

TABLE 1

| Command | Initiating Bus = | |
|---|---|---|
| | Primary Bus | Secondary Bus |
| Memory Read | No | Yes, but can be disabled |
| Memory Read Multiple | Yes | Yes |
| Memory Read Line | Yes | Yes |

Thus, for example, if the device $107_2$ initiates a PCI Memory Read Multiple transaction requesting data from the device $109_1$, the bridge circuit 501 recognizes the read transaction for the device $109_1$ and initiates a prefetch transaction (with all four of the C/BE# signals set to zero) on the bus 103 using the address provided by the device $107_2$ on the bus 101. The device $109_1$ provides the requested read data to the bridge circuit 501 and generates, on the next clock cycle, the PAR signal with the appropriate logic level. The parity circuit 503 receives the PAR signal from the target device $109_1$, and generates the PAR signal for the bus 101 so that a data parity error in the read data on the bus 103, if any, is preserved or passed through to the initiating device $107_2$ on the bus 101. Of course, if the parity for the read data on the bus 103 is correct, the bridge circuit 501 generates the PAR signal on the bus 101 with the correct logic level to preserve the correct parity.

Figure 1:
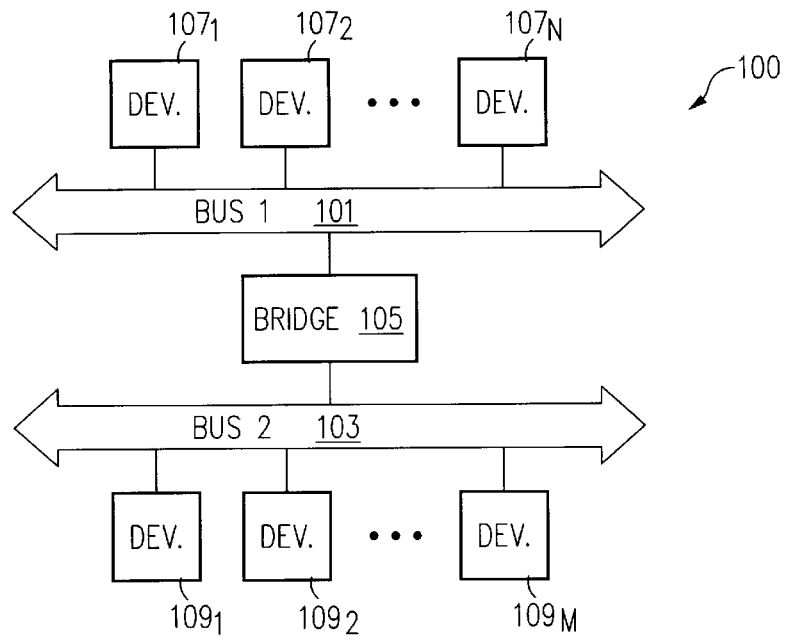
FIG. 1 is a block diagram of a multi-bus system with a bridge.
Figure 2:
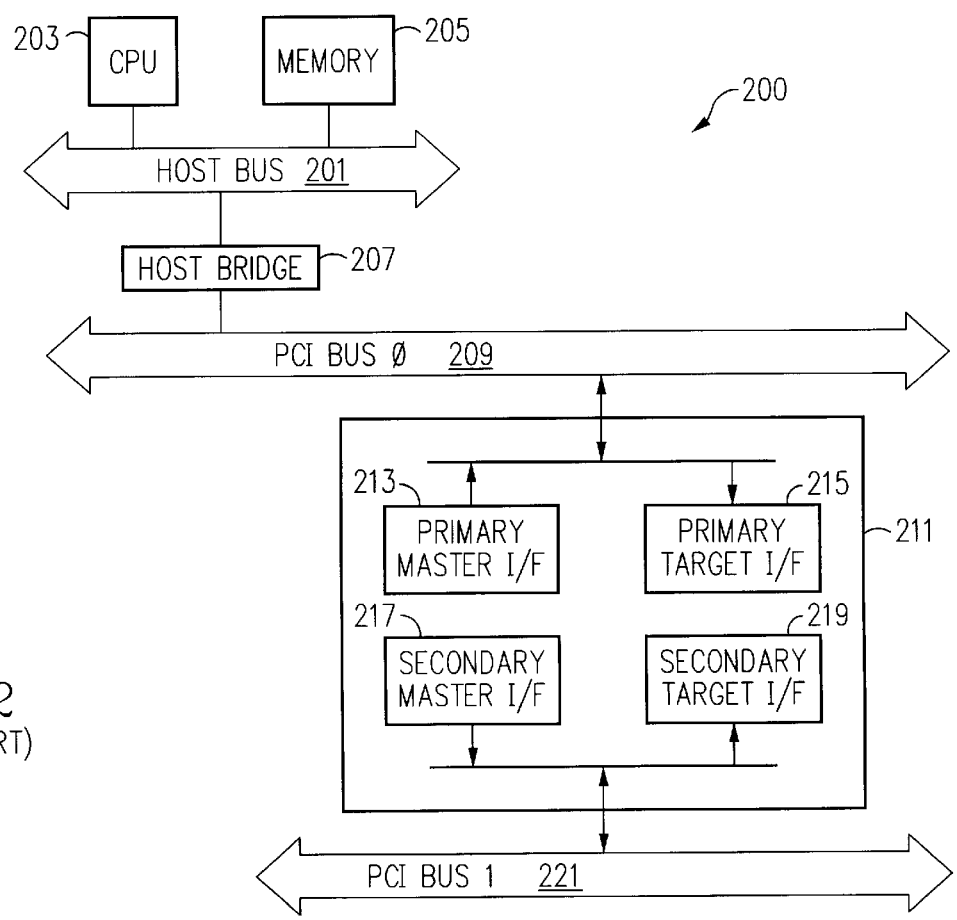
FIG. 2 is a block diagram of a computer system with two PCI buses and a PCI-to-PCI bridge.
Figure 3:
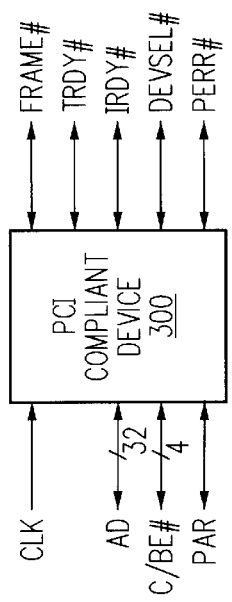
FIG. 3 is a block diagram of a PCI compliant device.
Figure 4:
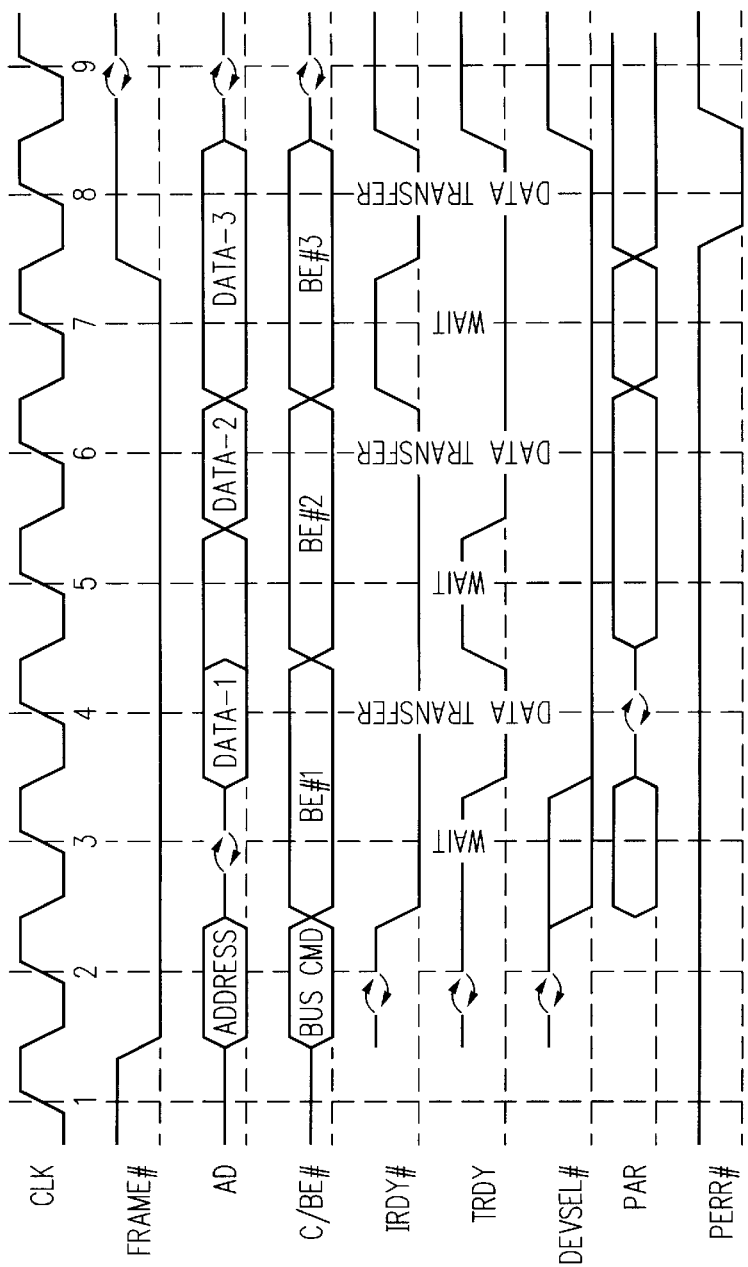
FIG. 4 is a timing diagram of an exemplary read operation.
Figure 6:
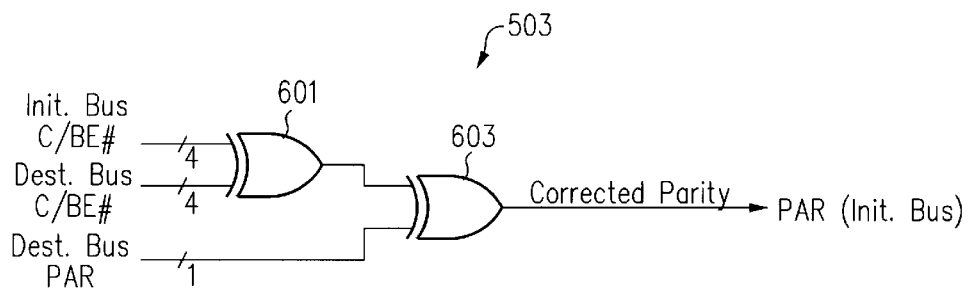
FIG. 6 is a schematic diagram of a parity circuit according to one embodiment of the present invention.

FIG. 6 is a schematic diagram illustrating a parity circuit 503 according to one embodiment of the present invention adapted for use with a PCI-to-PCI bridge circuit. The parity circuit 503 includes exclusive-OR (XOR) gates 601 and 603. The XOR gate 601 is an eight-input XOR gate coupled to receive the four C/BE# signals from the initiating PCI bus and the four C/BE# signals from the destination PCI bus. The output lead of the XOR gate 601 is connected to the one input lead of the two-input XOR gate 603. The other input lead of the XOR gate 603 is coupled to receive the PAR signal from the destination bus. The bridge circuit 501 (FIG. 5) typically includes a parity circuit 503 for the primary bus interface (FIG. 2) and another parity circuit substantially identical to the parity circuit 503 for the secondary bus interface.

In operation, the parity circuit 503 generates the corrected parity for the PAR signal on the initiating bus when the bridge circuit 501 (FIG. 5) initiates a prefetch transaction on the destination bus in response to one of the read transactions listed in Table 1. The XOR gate 601, in effect, compares the parity of the C/BE# signals from the initiating bus to the parity of the C/BE# signals from the destination bus. The parity circuit 503 need not compare the parity of the AD signals on the initiating bus to the AD signals on the destination bus because the two sets of data signals should be equivalent and, thus, should have matching parity.

If the parities of the two sets of C/BE# signals match, the XOR gate 601 outputs a logic low level to the XOR gate 603. Thus, the XOR gate 603 functions as a non-inverting buffer receiving the PAR signal from the destination bus. Consequently, the XOR gate 603 outputs a corrected parity signal with a logic level equivalent to the logic level of the PAR signal received from the destination bus. The corrected parity signal is output as the PAR signal on the initiating bus. If, on the other hand, the parities of the two sets of C/BE# signals do not match, the XOR gate 601 outputs a logic high level to the XOR gate 603. This logic high level causes the XOR gate 603 to function as an inverter receiving the PAR signal from the destination bus. Consequently, the XOR gate 603 inverts the logic level of the PAR signal received from the destination bus to generate the corrected parity signal.

As a result, the parity circuit 503, in effect, compares: (a) the parity of the signals included in the data parity calculation for the read transaction on the destination bus to (b) the parity of all of the signals included in the data parity calculation for the prefetch transaction on the initiating bus. If these two parities match, the parity circuit 503 generates the PAR signal for the initiating bus with the same logic level as the PAR signal generated by the target device. However, if these two parities do not match, the parity circuit 503 generates the PAR signal for the initiating bus with the complement of the logic level of the PAR signal generated by the target device. Thus, the data parity of the prefetch transaction on the destination bus is passed though to the initiating bus.

Figure 7:
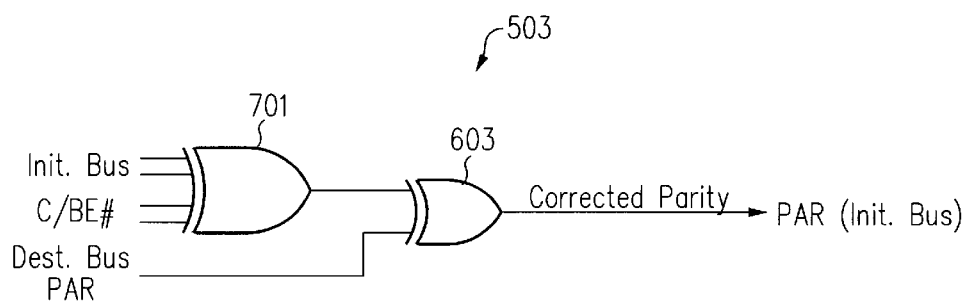
FIG. 7 is a schematic diagram of a second embodiment of a parity circuit according to the present invention.

FIG. 7 is a schematic diagram of a second embodiment of a parity circuit 503 according to the present invention adapted for use with a PCI-to-PCI bridge circuit. This embodiment of the parity circuit 503 is substantially similar to the embodiment of the parity circuit 503 depicted in FIG. 6 except that a four-input XOR gate 701 is used instead of the eight-input XOR gate 601. This embodiment takes advantage of the fact that in a typical prefetch transaction, all of the byte enable signals are asserted. Thus, the parity of the byte enable signals on the destination bus is known to be even during a prefetch transaction. Accordingly, the parity circuit 503 need not receive the C/BE# signals from the destination bus. Thus, the XOR gate 701 is coupled to receive the C/BE# signals from the initiating bus.

In operation, if the parity of the C/BE# signals from the initiating bus is even, the parity of the C/BE# signals from the initiating bus matches the known even parity of the C/BE# signals from the destination bus. The even parity of the C/BE# signals from the initiating bus causes the XOR gate 701 to output a logic low level to the XOR gate 603, which causes the XOR gate 603 to output the parity signal for the initiating bus with the same logic level as the PAR signal received from the destination bus. However, if the parity of the C/BE# signals from the initiating bus is odd (i.e., opposite of the parity of the prefetch byte enable signals), the XOR gate 603 outputs a logic high level signal, which causes the XOR gate 603 to output the parity signal for the initiating bus with a logic level that is the complement of the PAR signal received from the destination bus. Accordingly, the data parity of the prefetch transaction on the destination bus is passed through to the initiating bus.

Table 2 below summarizes the operation of the parity circuit 503 for read/prefetch transactions as a function of various parity combinations of data and byte enable signals. For example, the third row of Table 2 summarizes that in response to a prefetchable read transaction from the initiating bus, on the destination bus the target device provides the data signals with even parity and the PAR signal with a logic low level. Because a prefetch transaction was used on the destination bus, the bridge circuit provides the byte enable signals on the destination bus with even parity. Thus, there is no data parity error on the destination bus.

The bridge circuit passes the data onto the initiating bus with even parity. The initiating device has provided the byte enable signals on the initiating bus with odd parity in this case. Thus, the parity circuit 503 has generated the PAR signal on the initiating bus with a logic high level, preserving the correct parity from the destination bus.

In contrast, the fourth row of Table 2 shows that the target device has placed even parity data on the destination bus with a logic high PAR signal, thereby indicating a data parity error. The bridge circuit passes the even parity data to the initiating bus. Because the initiating device has provided odd parity byte enable signals on the initiating bus, the parity circuit 503 provides the PAR signal on the initiating bus with logic low parity, thereby preserving the incorrect parity from the destination bus.

TABLE 2

| Destination Bus | | | | Initiating Bus | | | |
| --- | --- | --- | --- | --- | --- | --- | --- |
| AD | C/BE# | PAR | Data Parity Error? | AD | C/BE# | PAR (Corrected Parity) | Data Parity Error? |
| Even | Even | 0 | No | Even | Even | 0 | No |
| Even | Even | 1 | Yes | Even | Even | 1 | Yes |
| Even | Even | 0 | No | Even | Odd | 1 | No |
| Even | Even | 1 | Yes | Even | Odd | 0 | Yes |
| Odd | Even | 0 | Yes | Odd | Even | 0 | Yes |
| Odd | Even | 1 | No | Odd | Even | 1 | No |
| Odd | Even | 0 | Yes | Odd | Odd | 1 | Yes |
| Odd | Even | 1 | No | Odd | Odd | 0 | No |

Figure 8:
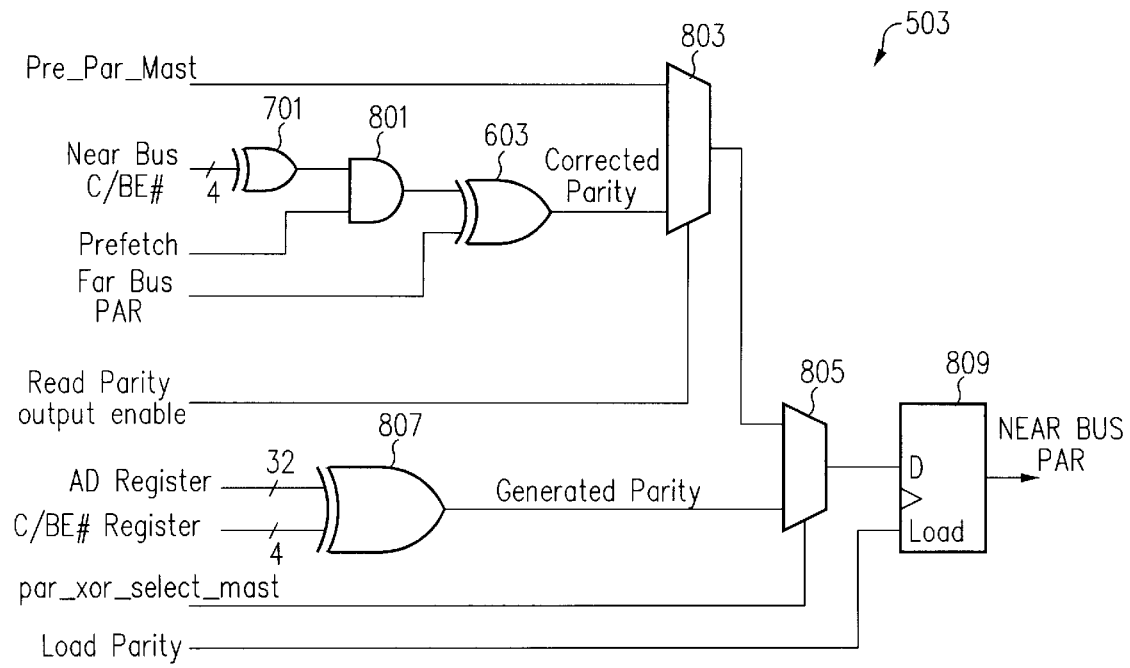
FIG. 8 is a schematic diagram of a third embodiment of a parity circuit according to the present invention.

FIG. 8 is a schematic diagram of a third embodiment of the parity circuit 503 according to the present invention adapted for use in an interface circuit 502 (FIG. 5) of a PCI-to-PCI bridge circuit. This embodiment of the parity circuit 503 includes an AND gate 801, multiplexers 803 and 805, an XOR gate 807 and a flip-flop 809, in addition to the XOR gates 701 and 603 that operate in a similar manner as described above in conjunction with FIG. 7. This additional logic allows the parity circuit 503 to selectively generate the appropriate PAR signal on the connected bus for various operational modes of the bridge circuit 501 (FIG. 5). These modes are summarized below in Table 3.

TABLE 3

| Mode | Interface Acts As | Parity to Output |
| --- | --- | --- |
| target of read/prefetch | Target | corrected parity |
| target of read/no prefetch | Target | parity received on far (destination) bus interface |
| target of write | Target | none needed |
| master of read | Master | parity received on far bus interface OR generated parity (parity only needed for address phase) |
| master of write | Master | parity received on far bus interface OR generated parity |

It will be appreciated by those skilled in the art of bridge circuits that when the interface circuit 502 is acting as a target, the bus to which the interface circuit 502 is connected is considered the initiating bus while the other bus is considered the destination bus. When the interface circuit 502 is acting as a master, these designations are reversed. For clarity, the bus connected to the parity circuit's bus interface is designated the "near" bus, while the other bus is designated as the "far bus." Also note that in other embodiments, the parity circuit 503 may include logic for use in a test mode in which the PAR signal can be inverted from the normal logic level.

This embodiment of the parity circuit 503 0f FIG. 8 is interconnected as follows. The XOR gate 701 is a four-input XOR gate coupled to receive the C/BE# signals from the near bus when the parity circuit 503 is acting as a target. The output lead of the XOR gate 701 is connected to one input lead of the two-input AND gate 801. The other input lead of the AND gate 801 is coupled to receive a prefetch signal that, when asserted, indicates that the far bus transaction is a prefetch transaction. In this embodiment, the prefetch signal is generated in a conventional manner according to Table 1 by the target state machine (FIG. 2) for the initiating (near) bus interface. In the embodiment shown in FIG. 8, the parity circuit 503 is incorporated into the secondary bus interface of the bridge circuit 501 (FIG. 5). The output lead of the AND gate 801 is connected to one of the input leads of the two-input XOR gate 603. The other input lead of the XOR gate 603 is coupled to receive the PAR signal from the destination bus.

The output lead of the XOR gate 603 is connected to one input lead of the two-input multiplexer 803. The other input lead of the multiplexer 803 is coupled to receive a pre__par__mast signal which is equivalent to the PAR signal received on the far bus interface when the interface circuit 502 is acting as a master. The multiplexer 803 has a select input lead that is connected to receive a read__parity__output__enable signal, which is generated by the target state machine associated with the near bus interface to select between (a) the corrected parity signal for the prefetch data when the near bus interface is acting as a target and (b) the pre__par__mast signal that passes the far bus parity signal when the near bus interface is acting as a master.

The output lead of the multiplexer 803 is connected to an input lead of the two-input multiplexer 805. The other input lead of the multiplexer 805 is coupled to receive a generated parity signal from the thirty-six-input XOR gate 807. Of course, the XOR gate 807 may be implemented with several smaller XOR gates to provide the equivalent function. The XOR gate 807 generates, in a conventional manner, the parity signal for the data and byte enable signals that the bridge circuit 501 (FIG. 5) sometimes provides on a bus when the interface circuit 502 is acting as a master. The select input lead of the multiplexer 805 is coupled to receive a signal par__xor__select__mast, which is generated by the master state machine associated with the near bus interface, to select one of the two input signals to the multiplexer 805. For example, the signal par__xor__select__mast would be at a logic high level to select the generated parity from the XOR gate 807 when the interface circuit 502 (FIG. 5) is the master of the secondary bus and generated parity is to be used (see Table 3).

The output lead of the multiplexer 805 is connected to the data input lead of the flip-flop 809. The flip-flop 809 buffers the selected parity signal so that the PAR signal can be generated in accordance with PCI bus timing requirements. In this embodiment, the flip-flop 809 has a load input lead coupled to receive a load signal from either the master or target state machines associated with the parity circuit's bus interface to enable the flip-flop 809 to load the signal received from the multiplexer 807.

In operation, the parity circuit 503 generates the PAR signal for the PCI bus coupled to the parity circuit's bus interface. In the read/prefetch mode (see Table 3), the prefetch signal is asserted, thereby causing the AND gate 801 to pass through the output signal of the XOR gate 701 to the XOR gate 603. The XOR gates 701 and 603 output the corrected parity signal as described above in conjunction with FIG. 7 The target state machine asserts the read__parity__output__enable signal and the master state machine deasserts the par__xor__select__mast signal so that the multiplexers 803 and 805 select the corrected parity signal from the XOR gate 603, which is then loaded in the flip-flop 809.

In mode(s) in which the parity circuit 503 passes through the parity received on the far bus interface while the interface circuit 502 is acting as a master, the target state machine deasserts the read__parity__output__enable signal and the master state machine deasserts the par__xor__select__mast signal. As a result, the multiplexer 803 selects the pre__par__mast signal, which the multiplexer 805 then provides to the flip-flop 809 to be loaded and outputted as the PAR signal.

In mode(s) in which the interface circuit 502 generates the AD and C/BE# signals on the near bus and the corresponding parity signal directly therefrom, the master state machine asserts the par__xor__select__mast signal, which causes the multiplexer 805 to select the generated parity signal from the XOR gate 807. As a result, the generated parity signal is provided to the flip-flop 809 to be loaded and outputted as the PAR signal.

Figure 9:
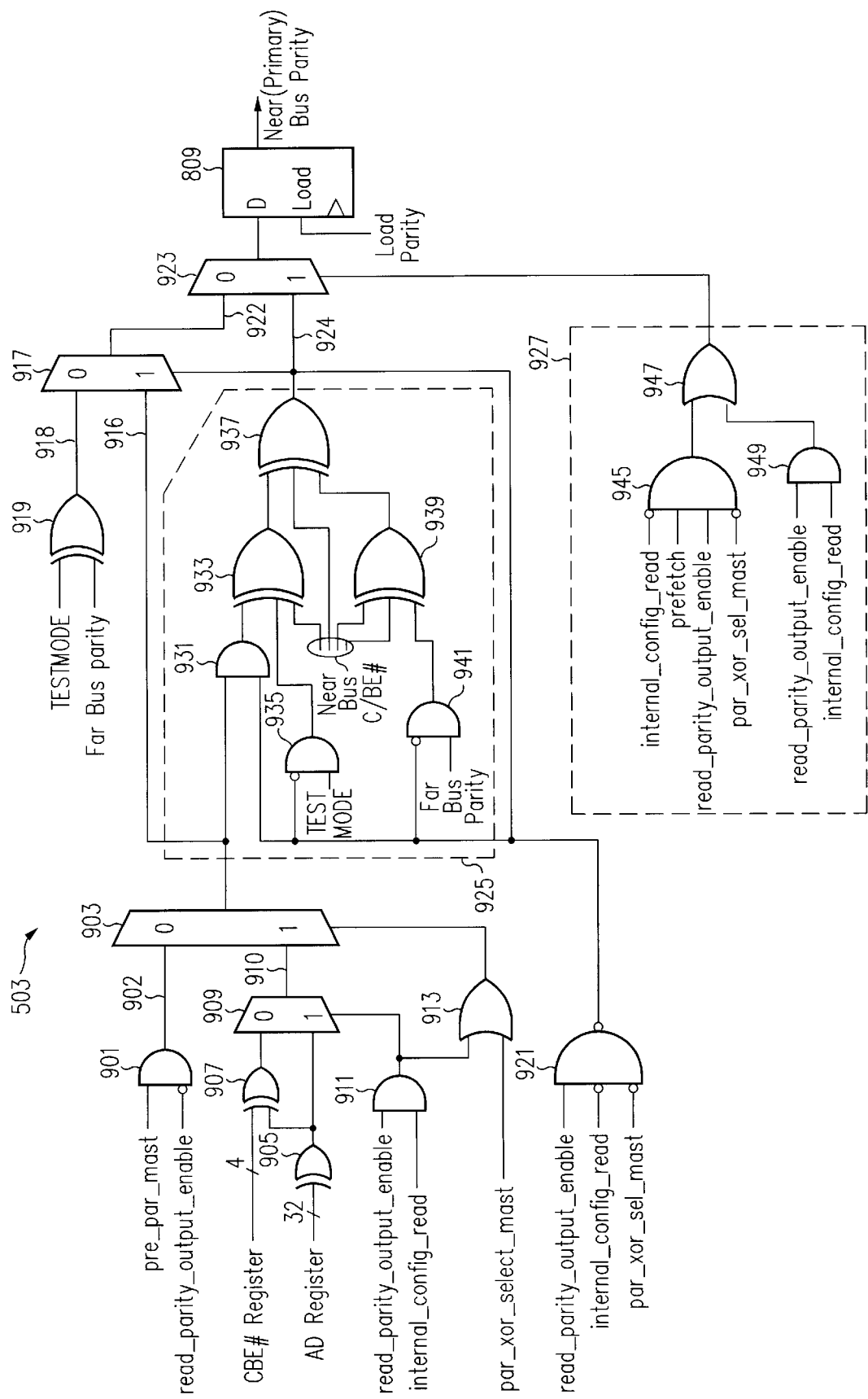
FIG. 9 is a schematic diagram of a fourth embodiment of a parity circuit according to the present invention.

FIG. 9 is a schematic diagram of another embodiment of the parity circuit 503 which supports an additional mode of operation, summarized below in Table 4. This embodiment is advantageously used to provide the PAR signal to the primary bus interface.

TABLE 4

| Mode | Interface Acts As | Parity to Output |
| --- | --- | --- |
| Target of read to internal configuration registers | Target | Generated parity from AD output and C/BE# received |

Table 5 below summarizes the signals generated by the master and target state machines of the bus interface for the primary bus interface. These signals are also used in the embodiment of FIG. 8, with the exception of the last two signals in the table (i.e., the test mode signal and the internal_config_read signal signal). In light of the present disclosure, these signals are sufficiently defined so as to enable those skilled in the art of bus interfaces to implement master and target state machines generating these signals for both the primary and secondary bus interfaces, without undue experimentation.

TABLE 5

| Signal Name | Function |
| --- | --- |
| prefetch | Indicates that the interface is acting as a target for a prefetched read transaction when asserted |
| pre_par_mast | Indicates data parity of the far bus when the interface is acting as a master |
| read_parity_output_enable | Indicates that the interface is acting as a target for a read transaction when asserted |
| par_xor_select_mast | Indicates that parity should be generated while the interface in the master mode when asserted |
| load parity | Enable signal for the parity signal output flip-flop |
| test mode | Control signal to cause parity to be inverted when interface is in target mode for a read when asserted |
| internal_config_read | Indicates that the interface is acting as a target for a read to the PCI-to-PCI bridge internal configuration registers when asserted |

In this embodiment, the parity circuit 503 includes a two-input AND gate 901 configured to invert and then receive the read_parity_output_enable signal. The AND gate 901 is also connected to receive the pre_par_mast signal. The output lead of the AND gate 901 is connected to an input lead 902 of a two-input multiplexer 903. The parity circuit 503 also includes two XOR gates 905 and 907 respectively connected to the AD and C/BE# registers of the bridge circuit 501 (FIG. 5). Thus, the XOR gate 907 generates parity in the same manner as the XOR gate 807 (FIG. 8). The XOR gate 907 also has an input lead connected to the output lead of the XOR gate 905. A two-input multiplexer 909 has its input leads connected to the output leads of the XOR gates 905 and 907. The multiplexer 909 has its output lead connected to the other input lead 910 of the multiplexer 903. A two-input AND gate 911 is connected to receive the read_parity_output_enable and the internal_config_read (see Table 5) signals. The output lead of the AND gate 911 is connected to the select or control lead of the multiplexer 909 and to an input lead of a two-input OR gate 913. In addition, the OR gate 913 has another input lead connected to receive the par_xor_select_mast signal and an output lead connected to the select lead of the multiplexer 903.

The output lead of the multiplexer 903 is connected to one input lead 916 of a two-input multiplexer 917. The other input lead 918 of the multiplexer 917 is connected to the output lead of a two-input XOR gate 919, which is connected to receive the test mode signal (see Table 5) and the destination (far) bus parity signal. A three-input NAND gate 921 is connected to provide the control signal for the multiplexer 917. More specifically, the NAND gate 921 has its output lead connected to the select lead of the multiplexer 917, and has its input leads connected to receive the read_parity_output_enable signal, and inverted internal_config_read and par_xor_select_mast signals. In addition, the output lead of the multiplexer 917 is connected to an input lead 922 of a two-input multiplexer 923. The other input lead 924 of the multiplexer 923 is connected to an output lead of a configurable parity correction circuit 925, while the select lead of the multiplexer 923 is connected to an output lead of a decoder 927. In addition, the output lead of the multiplexer 923 is connected to the flip-flop 809, which receives a load parity signal and a clock signal as described above in conjunction with FIG. 8.

The configurable parity correction circuit 925 includes a two-input AND gate 931 connected to receive the output signals provided by the multiplexer 903 and the NAND gate 921. The output lead of the AND gate 931 is connected to one input lead of a three-input XOR gate 933. Another input lead of the XOR gate 933 is connected to the output lead of a two-input AND gate 935, which is connected to receive the output signal provided by the NAND gate 921 inverted, and the test mode signal from the target state machine. The third input lead of the XOR gate 933 is connected to receive one of the four C/BE# signals from the primary bus (i.e., the initiating bus in a read transaction). The output lead of the XOR gate 933 is connected to an input lead of a three-input XOR gate 937.

The XOR gate 937 has a second input lead connected to receive a second of the C/BE# signals from the primary bus. In addition, the XOR gate 937 has a third input lead connected to the output lead of a three-input XOR gate 939. The XOR gate 939 is connected to receive the third and fourth C/BE# signals from the primary bus. The XOR gate 939 is also connected to receive the output signal of a two-input AND gate 941. The AND gate 941 is connected to receive the output signal of the NAND gate 921, inverted, and the destination (far) bus parity signal. The output lead of the XOR gate 937 is connected to the input lead 924 of the multiplexer 923.

The decoder 927 includes a four-input AND gate 945 that is connected to receive the prefetch and read_parity_output_enable signals from the target state machine. The AND gate 945 is also configured to invert and then receive the internal_config_read and par_xor_select_mast signals from the target and master state machines, respectively. The output lead of the AND gate 945 is connected to an input lead of a two-input OR gate 947. The other input lead of the OR gate 947 is connected to the output lead of a two-input AND gate 949. The AND gate 949 is connected to receive the internal_config_read and the read_parity_output_enable signals from the target state machine. The output lead of the OR gate 947 is connected to the select lead of the multiplexer 923.

The parity circuit 503 of FIG. 9 operates as follows. During an operation in which the primary bus interface acts as a master, the parity signal from the secondary bus (i.e., the initiating bus in this transaction) is passed through to the primary bus (i.e., the destination bus in this transaction). During these transactions, the target state machine deasserts the read_parity_output_enable signal, causing the AND gate 901 to pass the pre_par_mast (i.e., the parity signal of the initiating bus) signal to the input lead 902 of the multiplexer 903. Further, the deasserted read_parity_output_enable signal causes the AND gate 911 to output a logic low level signal. In addition, the master state machine deasserts the par_xor_select_mast signal. Because the output signal of the AND gate 911 and the par_xor_select_mast signal are both at a logic low level, the OR gate 913 also outputs a logic low level signal, thereby causing the multiplexer 909 to select the pre_par_mast signal received on the input lead 902.

Still further, the deasserted read_parity_output_enable signal causes the NAND gate 921 to output a logic high level signal, which in turn causes the multiplexer 917 to select the pre_par_mast signal selected by the multiplexer 903. In addition, the deasserted read_parity_output_enable signal also causes the AND gates 945 and 949 to both output logic low level signals, which in turn causes the OR gate 947 to output a logic low level signal. Consequently, the logic low level from the OR gate 947 causes the multiplexer 923 to select the output signal from the multiplexer 917, thereby outputting the pre_par_mast signal to the destination bus through the flip-flop 809.

In modes in which the interface circuit 502 is the master of the primary bus and must generate parity on the primary bus, the master state machine asserts the par_xor_select_mast signal, thereby causing the OR gate 913 to output a logic high signal. As a result, the multiplexer 903 selects the output signal from the multiplexer 909. In addition, because in this type of mode the internal$_{13}$ config_read signal is deasserted, the AND gate 911 outputs a logic low level signal, thereby causing the multiplexer 909 to select the output signal from the XOR gate 907. The XOR gate 907 generates the parity of the C/BE# and AD registers, as described above for XOR gate 807 (FIG. 8). Further, the asserted par_xor_select_mast signal causes the NAND gate 921 to output a logic high level signal, thereby causing the multiplexer 917 to select the generated parity signal selected by the multiplexer 903. Still further, the asserted par_xor_select_mast signal causes the AND gate 945 to output a logic low level, which combined with the logic low level output by the AND gate 949 (as a result of the deasserted internal_config_read signal), causes the multiplexer 923 to select the generated parity signal from the multiplexer 917. Thus, the generated parity is outputted onto the primary bus through the flip-flop 809.

In modes in which a configuration register of the bridge circuit 501 is read, the internal_config_read and read_parity_output_enable signals are asserted by the target state machine. Consequently, the AND gate 911 outputs a logic high level signal, thereby causing the multiplexer 909 to select the output signal from XOR gate 905. Because in configuration read transactions the bridge circuit does not generate the C/BE# signals, the C/BE# register(i.e., the output signal of XOR gate 907) is not included in the parity generation for this transaction. Instead, the C/BE# signals from the initiating (primary) bus must be included in the configuration register read parity generation. It will be appreciated that the internal_config_read signal is not used in the embodiment of FIG. 8 because internal configuration read commands are ignored when received from the secondary bus, as defined in the aforementioned PCI-to-PCI bridge specification. In addition, the logic high output signal of the AND gate 911 causes the OR gate 913 to output a logic high level signal, thereby causing the multiplexer 903 to select the output signal (i.e., the parity of the AD register) selected by the multiplexer 909.

In addition, because the internal_config_read signal is asserted, the NAND gate 921 outputs a logic high level signal, which is received by the AND gates 931, 935 and 941. This logic high level causes the AND gates 935 and 941 to output logic low level signals to the XOR gates 933 and 939, respectively. However, this logic high level signal causes the AND gate 931 to propagate the parity of the AD register to the XOR gate 933. As a result, the XOR gates 933, 939 and 937 implement a parity generating circuit that, in effect, generates the parity of the AD register contents together with the C/BE# signals received from the primary bus(i.e., initiating bus in this operation). This generated parity is then selected by the multiplexer 923, under the control of the decoder 927. More specifically, the decoder 927 outputs a logic high level signal because the AND gate 949 outputs a logic high level signal (i.e., the AND gate 949 generates an output signal equivalent to the output signal of the AND gate 911). Thus, the multiplexer 923 provides the generated parity signal for an internal configuration register read operation to the flip-flop 809.

In prefetchable read modes, the prefetch and read_par_output_enable signals are asserted by the target state machine. In addition, the internal_config_read and par_xor_select_mast signals are deasserted by the target and master state machines, respectively. As a result, the AND gate 945 outputs a logic high level signal to the OR gate 947, which in turn outputs a logic high level signal to the multiplexer 923, thereby causing the multiplexer 923 to select the output of the configurable parity correction circuit 925. Further, the asserted read_par_output_enable and the deasserted internal_config_read and par_xor_select_mast signals cause the NAND gate 921 to output a logic low level signal, thereby causing the AND gate 931 to output a logic low level signal while causing the AND gates 935 and 941 to output signals equivalent to the test mode and far bus parity signals, respectively. Because the test mode signal is also deasserted, the XOR gates 933, 939 and 937, in effect, generate the corrected parity of the initiating (primary) bus C/BE# signals and the far bus parity signal as summarized in Table 2.

The configurable corrected parity circuit 925 is configured into a test mode to invert the corrected parity signal when the test mode signal received by the AND gate 935 is asserted.

In non-prefetchable read modes, the parity signal from the secondary bus (i.e., the destination bus in this type of transaction) is passed on to the primary bus (i.e., initiating bus in this type of transaction). More specifically, the test mode signal is deasserted, causing the XOR gate 919 to pass the far bus parity signal to the multiplexer 917 through the input lead 918. Further, because in this type of read mode the target state machine asserts the read_parity_output_enable signal and deasserts the internal_config_read and prefetch signals, and the master state machine deasserts the par_xor_select_mast signal, the NAND gate 921 and the AND gates 945 and 949 all output logic low level signals. The logic low level signal from the NAND gate 921 causes the multiplexer 917 to select the far bus parity signal from the XOR gate 919. The logic low level signals from the AND gates 945 and 949 cause the OR gate 947 to also output a logic low signal, thereby causing the multiplexer 923 to select the far bus parity signal selected by the multiplexer 917. Thus, the far bus parity signal is passed to the flip-flop 809 and onto the primary bus. For test purposes, the test mode signal can be asserted, thereby causing the XOR gate 919 to invert the far bus parity signal, which is then propagated to the primary bus as described above in this paragraph.

The embodiments of the parity correction logic described above are illustrative of the principles of this invention and are not intended to limit the invention to the particular embodiments described. For example, in view of this disclosure, those skilled in the art of parity generation circuits can implement, without undue experimentation, an embodiment for use with other types of buses. Of course, logic circuits different from the exclusive-OR circuits described can be used in other embodiments to compare the parity of the data and byte enable signals from the initiating bus to the data and byte enable signals from the destination bus. It will also be appreciated that the various logic gates with relatively large number of input signals can be implemented with cascaded logic gates that have fewer numbers of input signals. Further, different embodiments may be used in electronic systems other than computer systems. Accordingly, while the preferred embodiment of the invention has been illustrated and described, it will be appreciated that in view of the present disclosure, various changes can be made therein without departing from the spirit and scope of the invention.

The embodiments of the invention in which an exclusive property or privilege is claimed are defined as follow:

1. A bridge circuit for transferring information from a first bus to a second bus, said bridge circuit comprising:

a first interface coupled to said first bus;

a second interface coupled to said second bus; and a logic circuit coupled to receive from said first interface a first byte enable signal and a second byte enable signal corresponding to a read transaction on said first bus, and coupled to receive from said second interface a parity signal corresponding to a prefetch read transaction on said second bus, said prefetch read transaction on said second bus accessing data requested in said read transaction on said first bus, wherein said logic circuit is operative to provide to said first interface a parity signal that causes a data parity error for said read transaction on said first bus when said prefetch read transaction on said second bus has a data parity error.

2. The bridge circuit of claim 1 wherein said first bus and said second bus are PCI buses.

3. The bridge circuit of claim 1 wherein said logic circuit comprises an exclusive-OR circuit having a first input lead coupled to receive said first byte enable signal from said first interface, a second input lead coupled to receive said second byte enable signal from said first interface, a third input lead coupled to receive said parity signal from said second interface, and an output lead coupled to output said parity signal to said first interface.

4. The bridge circuit of claim 3 wherein said exclusive-OR circuit comprises:

a first exclusive-OR (XOR) gate having input leads coupled to said first and second input leads of said exclusive-OR circuit; and a second XOR gate having a first input lead coupled to an output lead of said first XOR gate, having a second input lead coupled to said third input lead of said exclusive-OR circuit and having an output lead coupled to said output lead of said exclusive-OR circuit.

5. The bridge circuit of claim 4 wherein said exclusive-OR circuit further comprises an AND gate having a first input lead coupled to said output lead of said first XOR gate and having a second input lead coupled to receive a control signal, and having an output lead coupled to said first input lead of said second XOR gate, wherein said control signal is at a logic high level in response to a data transfer phase of said prefetch read transaction on said first bus.

6. The bridge circuit of claim 5 wherein said logic circuit further comprises a storage element having an input lead coupled to said output lead of said exclusive-OR circuit.

7. The bridge circuit of claim 6 wherein said storage element comprises a flip-flop.

8. The bridge circuit of claim 1 wherein said logic circuit is coupled to receive from said second interface a third byte enable signal and a fourth byte enable signal corresponding to said prefetch read transaction on said second bus.

9. The bridge circuit of claim 8 wherein said logic circuit comprises an exclusive-OR circuit having a first input lead coupled to receive said first byte enable signal from said first interface, a second input lead coupled to receive said second byte enable signal from said first interface, a third input lead coupled to receive said parity signal from said second interface, a fourth input lead coupled to said third byte enable signal from said second interface, a fifth input lead coupled to receive said fourth byte enable signal from said second interface, and an output lead coupled to output said parity signal to said first interface.

10. The bridge circuit of claim 9 wherein said exclusive-OR circuit comprises:

a first exclusive-OR (XOR) gate having input leads coupled to said first, second, fourth and fifth input leads of said exclusive-OR circuit; and a second XOR gate having a first input lead coupled to an output lead of said first XOR gate, having a second input lead coupled to said third input lead of said exclusive-OR circuit and having an output lead coupled to said output lead of said exclusive-OR circuit.

11. A parity circuit configured to generate a parity signal in a bridge circuit, said bridge circuit including a first interface coupled to a first bus and a second interface coupled to a second bus, said parity circuit comprising:

a first lead coupled to receive from said first interface a first byte enable signal corresponding to a read transaction on said first bus;

a second lead coupled to receive from said first interface a second byte enable signal corresponding to said read transaction on said first bus;

a third lead coupled to receive from said second interface a parity signal corresponding to a prefetch read transaction on said second bus, said prefetch read transaction on said second bus accessing data requested in said read transaction on said first bus; and a fourth lead coupled to said first interface, wherein said parity circuit is operative to provide at said fourth lead a parity signal that causes a data parity error for said read transaction on said first bus when said prefetch read transaction on said second bus has a data parity error.

12. The parity circuit of claim 11 wherein said first bus and said second bus are PCI buses.

13. The parity circuit of claim 11 wherein said parity circuit further comprises:

a first exclusive-OR (XOR) gate having input leads coupled to said first and second leads of said parity circuit; and a second XOR gate having a first input lead coupled to an output lead of said first XOR gate, having a second input lead coupled to said third lead of said parity circuit and having an output lead coupled to said fourth lead of said parity circuit.

14. The parity circuit of claim 13 wherein said parity circuit further comprises an AND gate, said AND gate having a first input lead, a second input lead and an output lead, said first input lead of said AND gate coupled to said output lead of said first XOR gate, said second input lead of said AND gate coupled to receive a control signal, and said output lead of said AND gate coupled to said first input lead of said second XOR gate, wherein said control signal is at a logic high level in response to a data transfer phase of said read transaction on said first bus.

15. The parity circuit of claim 13 wherein said parity circuit further comprises a storage element having an input lead coupled to said output lead of said second XOR gate.

16. The parity circuit of claim 15 wherein said storage element comprises a flip-flop.

17. The parity circuit of claim 11 wherein said parity circuit further comprises a fifth lead and a sixth lead, said fifth and sixth leads respectively coupled to receive from said second interface a first byte enable signal and a second byte enable signal corresponding to said prefetch read transaction on said second bus.

18. The parity circuit of claim 17 wherein said parity circuit comprises an exclusive-OR circuit having a first input lead coupled to receive said first byte enable signal from said first interface, a second input lead coupled to receive said second byte enable signal from said first interface, a third input lead coupled to receive said parity signal from said second interface, a fourth input lead coupled to said first byte enable signal from said second interface, a fifth input lead coupled to receive said second byte enable signal from said second interface, and an output lead coupled to output said parity signal to said first interface.

19. The parity circuit of claim 18 wherein said exclusive-OR circuit comprises:

- a first exclusive-OR (XOR) gate having input leads coupled to said first, second, fourth and fifth input leads of said exclusive-OR circuit; and
- a second XOR gate having a first input lead coupled to an output lead of said first XOR gate, having a second input lead coupled to said third input lead of said exclusive-OR circuit and having an output lead coupled to said output lead of said exclusive-OR circuit.

20. A computer system comprising:

a first bus configured to carry information;

a second bus configured to carry information;

a bridge circuit configured to transfer information from said first bus to said second bus, said bridge circuit comprising:

a first interface coupled to said first bus;

a second interface coupled to said second bus; and a logic circuit coupled to receive from said first interface a first byte enable signal and a second byte enable signal corresponding to a read transaction on said first bus, and coupled to receive from said second interface a parity signal corresponding to a prefetch read transaction on said second bus, said prefetch read transaction on said second bus accessing data requested in said read transaction on said first bus, wherein said logic circuit is configured to provide to said first interface a parity signal that causes a data parity error for said read transaction on said first bus when said prefetch read transaction on said second bus has a data parity error.

21. The computer system of claim 20 wherein said first bus and said second bus are PCI buses.

22. The computer system of claim 20 wherein said logic circuit comprises an exclusive-OR circuit having a first input lead coupled to receive said first byte enable signal from said first interface, a second input lead coupled to receive said second byte enable signal from said first interface, a third input lead coupled to receive said parity signal from said second interface, and an output lead coupled to output said parity signal to said first interface.

* * * * *